US 6,661,236 B2

(12) United States Patent
Goers et al.

(10) Patent No.: US 6,661,236 B2
(45) Date of Patent: Dec. 9, 2003

(54) METHOD OF INITIALIZING A PLUGGABLE ELECTRICAL UNIT

(75) Inventors: Andreas Goers, Pattensen (DE); Helmut Michel, Hannover (DE); Reiner Bleil, Peine (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/000,571

(22) Filed: Oct. 23, 2001

(65) Prior Publication Data

US 2002/0077006 A1 Jun. 20, 2002

(30) Foreign Application Priority Data

Oct. 24, 2000 (DE) .......................................... 100 52 620

(51) Int. Cl.[7] ................................................ G06F 11/10
(52) U.S. Cl. ...................... 324/537; 710/302; 713/100; 340/5.1; 340/5.8
(58) Field of Search ............................. 702/57–59, 64, 702/65, 115, 119, 122, 123, 178, 183, 185, 188; 702/103–106, 134, 170, 171; 340/5.1, 5.8; 439/489; 710/300–304, 104, 8–19, 10; 713/1, 2, 100; 324/537, 73.1, 158.1, 765, 538

(56) References Cited

U.S. PATENT DOCUMENTS

| 5,018,146 A | * | 5/1991 | Sexton | 714/781 |
| 6,199,129 B1 | * | 3/2001 | Maul | 710/301 |
| 6,216,186 B1 | * | 4/2001 | Mayhead et al. | 710/301 |

* cited by examiner

Primary Examiner—Jay Patidar
Assistant Examiner—Vincent Q. Nguyen
(74) Attorney, Agent, or Firm—Michael M. Rickin

(57) ABSTRACT

A method of initializing a pluggable electrical unit in a modular system that has a base unit and at least one pluggable electrical unit connected via an interface. Each pluggable electrical unit has module electronics and a read-only memory with clearly identifying identifiers. The interface is equipped with a variable resistor in a feed line. The connection between the base unit and the pluggable electrical unit is established initially only partially, and only to the read-only memory, after switching on the power supply to the pluggable electrical unit. After that, the pluggable electrical unit is identified and, in accordance with the identity of the pluggable electrical unit, the full connection or full isolation between the base unit and the pluggable electrical unit is established.

14 Claims, 2 Drawing Sheets

METHOD OF INITIALIZING A PLUGGABLE ELECTRICAL UNIT

DESCRIPTION

BACKGROUND OF THE INVENTION

1. Field of the Invention

The invention relates to a method of initializing a pluggable electrical unit in a modular system.

2. Description of the Prior Art

Complex electrical engineering systems, in particular in measuring and control technology and in telecommunications, are often of a modular construction. This involves a large number of electrical units being accommodated in an enclosure of an electrical base unit in a pluggable manner. The pluggable electrical units are mechanically of an identical construction but electrically different according to their intended function.

When a complex system of this type is expanded by adding further pluggable electrical units while operation is in progress or when one of the pluggable electrical units is exchanged, there is the risk of electrical components of the pluggable electrical unit and/or of the base unit being damaged or destroyed if an electrical unit which, though mechanically able to be inserted into the slot, is not electrically and functionally intended for this slot is inserted into the slot. Even in the case of mechanically and electrically fitting pluggable electrical units, disruptions to units already in operation and damage to the unit to be inserted occur during insertion as a result of capacitive charging or discharging currents.

DE 196 10 556 discloses a bus access unit for connecting a subassembly of a programmable controller to a bus, which subassembly is spatially arranged in the base unit and is tested by means of a test contact and an evaluation circuit to ascertain that it is a plug-in module and, if it is a plug-in module, a variable resistor fitted into the feed line of the plug-in module is switched to low resistance after a predetermined waiting time. The variable resistor is switched to high resistance again when the potential at a test contact lies outside a predetermined value range after a predetermined stabilizing time.

EP 798 647 discloses an arrangement for the connection of a device to a line system in which the communication bus is reset each time a new device is inserted in order to avoid disruptions on the bus. It is disadvantageous in this case that the communication is temporarily suspended in the entire system.

Furthermore, EP 888 589 discloses a connecting method for connecting a subassembly of a programmable controller to a bus, in which firstly the power supply of the subassembly is connected in a ramp-shaped manner. Subsequently, the communication lines are switched unidirectionally to low resistance in such a way that transmission activities of the subassembly are prevented. Only when the subassembly re-sends an acceptance signal after successful evaluation of the bus traffic are the communication lines switched bidirectionally to low resistance.

All the known connecting methods require that the electrical interface of the plug-in module and that of the base unit coincide. Such uniform interfaces no longer allow individualizing of the electrical interface of the pluggable electrical units that is designed for the plug-in contact device, since plug-in contacts of the same name would be wired to different types of signals, which may also differ in the direction of signal transmission. If the free choice of slots is maintained for all the pluggable electrical units, the number of necessary plug-in contacts increases in proportion to the degree of individualization of the pluggable electrical units, and so does the complexity of the backplane wiring and of the bus access units. This additional complexity is felt to be disadvantageous. In addition, the overall size of the plug-in connector increases with the number of pins. Plug-in connectors of a larger overall size are at odds with the miniaturization of pluggable electrical units.

The invention is therefore based on the object of specifying a method of initializing a pluggable electrical unit in a modular system which is suitable for taking into account electrical interfaces of different types for electrically and functionally different plug-in modules while maintaining the free choice of slots in such a way that disruptions to units already in operation and damage to the unit to be inserted are avoided.

SUMMARY OF THE INVENTION

The invention is based on a modular system comprising a base unit and at least one pluggable electrical unit, each pluggable electrical unit having module electronics and a read-only memory with clearly identifying identifiers. The interface between the base unit and the pluggable electrical unit is provided with a variable resistor, arranged in a feed line, first switching means, via which the read-only memory is disconnected from the base unit, and second switching means, via which the module electronics are disconnected from the base unit.

The essence of the invention is to establish the connection between the base unit and the pluggable electrical unit initially only partially, and only to the read-only memory, after switching on the power supply to the pluggable electrical unit. After that, the pluggable electrical unit is identified and, in accordance with the identity of the pluggable electrical unit, the full connection or full isolation between the base unit and the pluggable electrical unit is established.

This reliably avoids any disruption being caused to other units already in operation by differently configured signal lines for the connection of the pluggable electrical unit to the base unit.

To be specific, in a first step the variable resistor is brought into its low-resistance state in a controlled ramp-shaped manner after the elapse of a first waiting time, which begins with the insertion of the pluggable electrical unit.

In a second step, the first switching means are switched to conduct and the read-only memory is connected to the base unit after the elapse of a second waiting time, beginning with the end of the first waiting time.

The identifying identifiers are read from the read-only memory. On the basis of the identifying identifiers, the compatibility of the pluggable electrical unit with the base unit is tested.

If it is compatible, the interface of the base unit is configured in accordance with the identifying identifiers, the second switching means are switched to conduct and the module electronics are connected to the base unit. This fully connects the pluggable electrical unit electrically to the base unit.

If it is incompatible, the read-only memory is disconnected from the base unit and the variable resistor is brought in a controlled manner into its high-resistance state. This fully isolates the pluggable electrical unit from the base unit.

Consequently, disruptions to units already in operation and damage to the pluggable electrical unit are reliably avoided.

DESCRIPTION OF THE DRAWINGS

Further details and advantages of the invention are explained in more detail below on the basis of an exemplary embodiment. In the drawings required for this purpose.

DESCRIPTION OF THE PREFERRED EMBODIMENT

Figure 1:
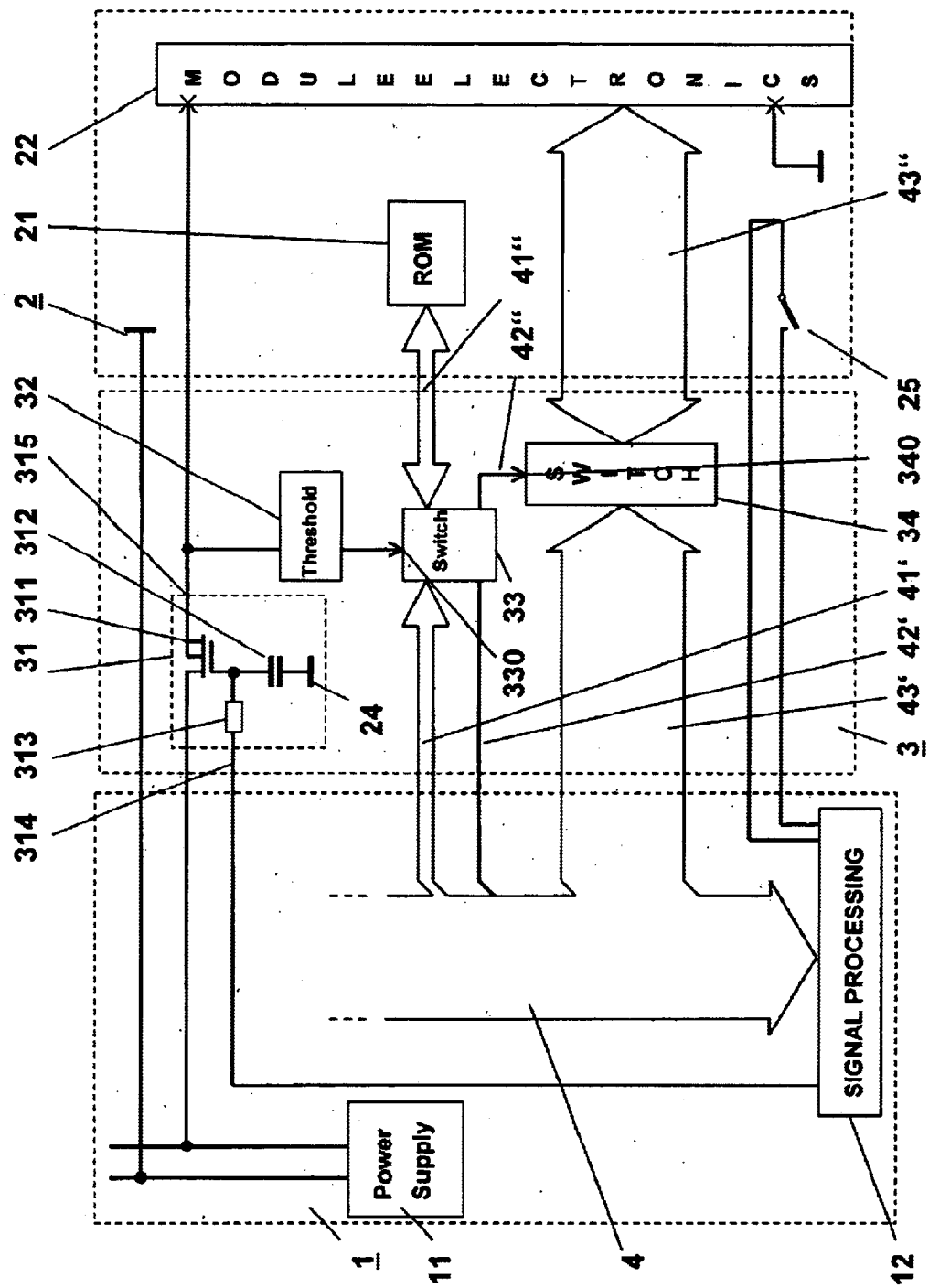
FIG. 1 shows a basic representation of a modular system.

Other pluggable electrical units 2 may have only a data bus of a smaller width, for example 8 bits, and accordingly have only eight data lines. The differing data bus width of the pluggable electrical unit 2 is noted in the individual configuration data, which are stored in the read-only memory 21 and can be read out by the signal processing means 12 of the base unit 1, so that the data transmission between the base unit 1 and this pluggable electrical unit 2 takes place on only eight data lines of the backplane wiring bus 4.

FIG. 1 shows a base unit 1 with a signal processing means 12 and a power supply device 11 for feeding the signal processing means 12 and all connectable pluggable electrical units 2.

The signal processing means 12 of the base unit 1 comprises a microcontroller circuit with a plurality of input/output terminals, which can be configured as address terminals, as data terminals and as control terminals. Microcontrollers of this type are known per se. For example, the type 80C517 is equipped with 56 digital input/output terminals, which are grouped together in seven bidirectional 8-bit ports. Each of these 56 port terminals can itself be configured as desired as an input or output terminal. By alternately successive configuration as an input terminal and output terminal, each port terminal can be set as a bidirectional terminal for successive reading and writing. In addition, the microcontroller has control-signal terminals of a predetermined and unalterable logical signal assignment and direction of signal transmission.

Connected to the signal processing means 12 of the base unit 1 is the backplane wiring bus 4, which comprises signal lines of an identification bus 41, a control line 42 and signal lines of a module bus 43. The backplane wiring bus 4 is routed to each slot for receiving a pluggable electrical unit 2.

In addition, a pluggable electrical unit 2 is represented by way of example in FIG. 1, only the means necessary for explanation of the invention being shown. The functionality of the pluggable electrical unit 2 is accommodated in the module electronics 22. The pluggable electrical unit 2 is additionally provided with a read-only memory 21. The read-only memory 21 has identifiers clearly identifying the pluggable electrical unit 2. In addition, it may be provided that individual configuration data of the pluggable electrical units 2 are stored in the read-only memory 21.

The read-only memory 21 is preferably of the serial type. In particular, the read-only memory 21 has an I²C interface and the identification bus 41 is designed as an I²C bus. The specification of the I²C bus known per se is described in detail in "I²C-Bus angewandt—Chips und Schaltungen" [I²C bus in use—chips and circuits], Elektor Verlag Aachen 1995.

Arranged between the base unit 1 and the pluggable electrical unit 2 is an interface device 3. The interface device 3 may be configured as part of the base unit 1, part of the pluggable electrical unit 2 or as a separate plug-in unit. The interface device 3 is equipped with a variable resistor 31, which is arranged in the feed line for the power supply of the pluggable electrical unit 2 from the base unit 1. The variable resistor 31 comprises an enhancement-mode n-channel MOSFET 311 (Metal-Oxide-Silicon Field-Effect Transistor), the source-drain path of which is connected into the current path of the feed line and the gate terminal of which is connected via a timing element to a control input 314. The timing element comprises a resistor 313, which is connected between the control input 314 and the gate terminal of the MOSFET 311, and a capacitor 312, which is connected between the gate terminal of the MOSFET 311 and frame potential.

The drain terminal of the MOSFET 311 is connected to the power supply device 11. The source terminal of the MOSFET 311 is the controlled terminal 315 of the variable resistor 31.

As long as the control input 314 is voltage-free with respect to frame potential, the source-drain path of the MOSFET 311 is at high resistance. As soon as a positive voltage with respect to frame potential 24 is applied to the control input 314, the voltage across the capacitor 312, and consequently the gate-source voltage of the MOSFET 311, slowly increases. As a result, the source-drain path of the MOSFET 311 becomes lower in its resistance and the voltage at the controlled terminal 315 increases in a ramp-shaped manner.

Furthermore, the interface device 3 is equipped with two switching means 33 and 34, which are configured as bus switch arrangements and which respectively have a control input 330 and 340 and a plurality of pairs of terminals, not designated any more precisely, the terminals of each pair of terminals being disconnected from each other at high resistance or connected to each other at low resistance in dependence on the logical signal level at the associated control input 330 and 340.

Bus switches of this type are known per se and commercially available in various configurations. For example, the type QS3384 of the company Integrated Device Technology (IDT) has ten pairs of terminals for connecting and disconnecting signal lines, five pairs of terminals in each case being assigned a common control input. Each pair of terminals is connected to each other by an electronic switch, the resistance of which in the closed state is typically 5 ohms. The electronic switches are designed for bidirectional signal flow.

The first bus switch arrangement 33 is intended for the isolation of signal lines of the identification bus 41', 41" and of the control line 42', 42". Here and below, the single-primed reference numerals 41' and 42' stand for non-isolated lines, which are branched off from the backplane wiring bus 4, and the double-primed reference numerals 41" and 42" stand for isolated lines, which are arranged between a bus switch arrangement 33 and 34 and further switching means of the pluggable electrical units 2.

To be specific, the isolated signal lines of the identification bus 41" are connected between the first bus switch arrangement 33 and a read-only memory 21.

The first control input 330 of the first bus switch arrangement 33 is connected via a threshold circuit 32 to the controlled terminal 315 of the variable resistor 31.

The second bus switch arrangement 34 is intended for the isolation of the module bus 43' and 43". The isolated lines of the module bus 43" are connected to the module electronics 22.

Finally, the pluggable electrical unit 2 has a switch 25, the terminals of which are connected to the signal processing means 12 of the base unit 1. The switching contact of the switch 25 is open in the rest position and closed in the fully inserted state of the pluggable electrical unit 2. The switch 25 is preferably coupled to means for locking the pluggable electrical unit 2 in the base unit 1.

Figure 2:
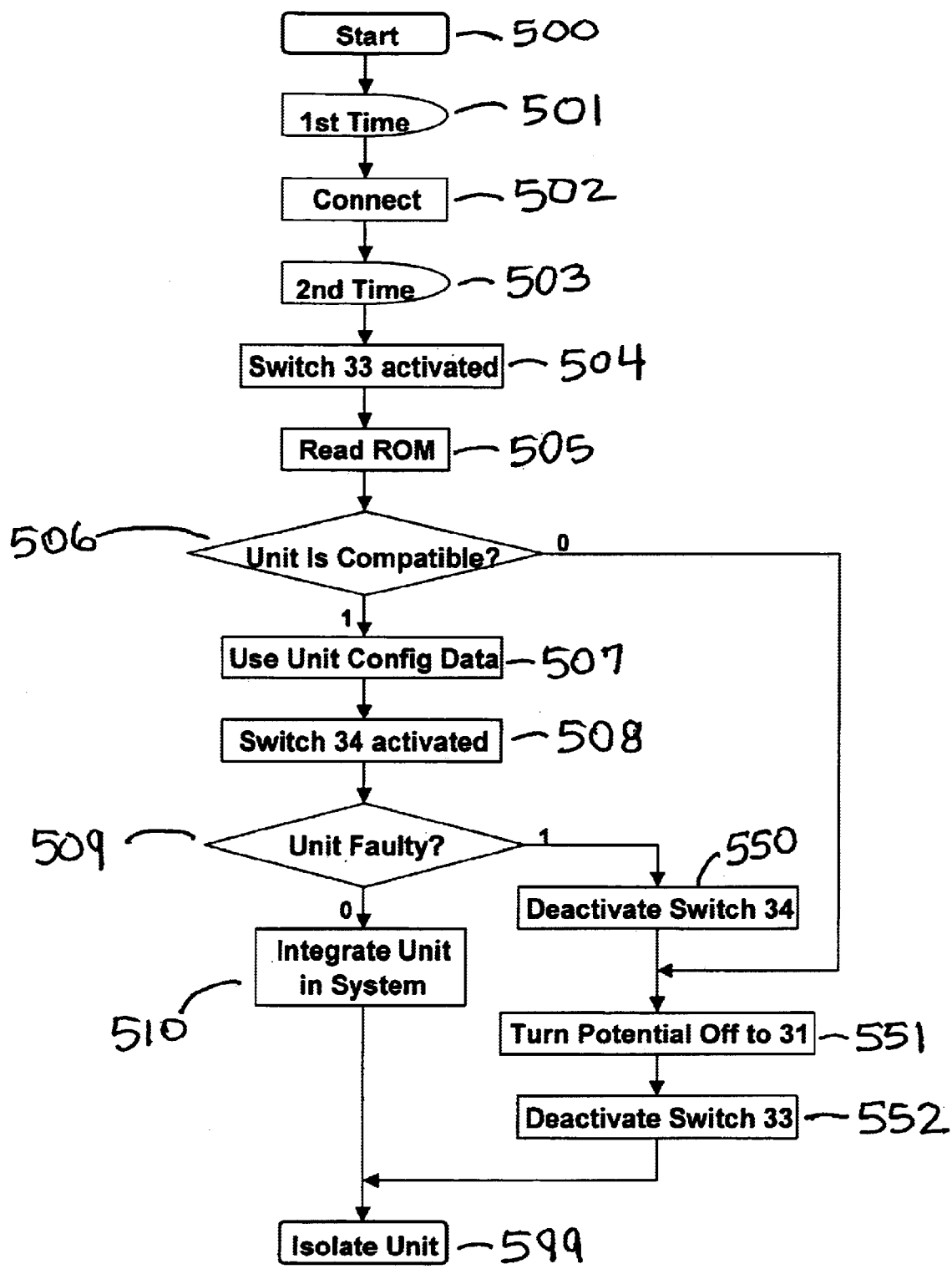
FIG. 2 shows a representation of the steps according to the method in a program flowchart.

In the following text, the sequence of steps for initializing the pluggable electrical unit 2 into the modular system is explained on the basis of a flowchart with reference to FIG. 2 while reverting to the means shown in FIG. 1.

During insertion, the switch 25 is open. The variable resistor 31 is in its high-resistance state. The bus switch arrangements 33 and 34 are inactive. Accordingly, the isolated signal lines of the identification bus 41", the isolated control line 32" and the isolated lines of the module bus 43" are isolated from the non-isolated signal lines of the identification bus 41', the non-isolated control line 42' and the non-isolated lines of the module bus 43'.

After the insertion of the pluggable electrical unit 2 into a slot of the base unit 1, the pluggable electrical unit 2 is mechanically locked in the base unit 1. In this case, the switch 25 is closed and the presence of the pluggable electrical unit 2 at the respective slot is indicated to the signal processing means 12 of the base unit 1. As a consequence of this, it is attempted by the signal processing means 12 of the base unit 1 to commence communication with the pluggable electrical unit 2. The event of the switch 25 closing is the start, step 500, of the initialization.

In the following step 501, a first predeterminable waiting time is allowed to pass, after the elapse of which all the capacitive recharging operations have been completed.

In the following step 502, the pluggable electrical unit 2 is connected to the power supply. For this purpose, a positive potential is connected to the control input 314 of the variable resistor 31.

In the following step 503, a second predeterminable waiting time is allowed to pass, during which the variable resistor 31 becomes increasingly conductive and goes over into its low-resistance state in a ramp-shaped manner. In the low-resistance state of the variable resistor 31, the module electronics 22 and the bus switch arrangements 33 and 34 are connected to the power supply 11. In the embodiment shown in FIG. 1, the second waiting time is formed by the time constant of the timing element comprising the resistor 313 and the capacitor 312.

As soon as the voltage at the controlled terminal 315 of the variable resistor 31 reaches the minimum admissible value of the nominal voltage, the output level of the threshold circuit 32 changes and the first bus switch arrangement 33 is switched to conduct, in step 504. Consequently, the isolated signal lines of the identification bus 41" are connected in a conducting manner to the non-isolated signal lines of the identification bus 41' and the isolated control line 42" is connected in a conducting manner to the non-isolated control line 42'. There is now a communication channel via the backplane wiring bus 4 and the signal lines of the identification bus 41' and 41" between the signal processing means 12 of the base unit 1 and the read-only memory 21 of the pluggable electrical unit 2.

In the next step 505, the identifiers contained in the read-only memory 21 and clearly identifying the pluggable electrical unit 2 are read out by the signal processing means 12 of the base unit 1.

In the then following step 506, the compatibility of the pluggable electrical unit 2 with the base unit 1 is tested on the basis of the identifying identifiers.

If the incompatibility of the pluggable electrical unit 2 with respect to the base unit 1 is established from the identifying identifiers, branch "0" of decision step 506, the positive potential to the control input 314 of the variable resistor 31 is switched off in step 551. The variable resistor 31 then goes over into its high-resistance state in a ramp-shaped manner and the switching means of the pluggable electrical unit 2 are disconnected from the power supply. In step 552, the first bus switch arrangement 33 is deactivated and the connection between the isolated signal lines of the identification bus 41" and the isolated control line 42" and the associated non-isolated signal lines of the identification bus 41' and the non-isolated control line 42' is disconnected. In step 599, all the signal lines of the pluggable electrical unit 2 are isolated from the signal lines of the base unit 1 and the sequence is ended. The incompatible pluggable electrical unit 2 is passive in the modular system. Disruptions to units already in operation and damage to the unit to be inserted are consequently avoided.

If the compatibility of the pluggable electrical unit 2 with respect to the base unit 1 is established from the identifying identifiers, branch "1" of decision step 506, the individual configuration data of the pluggable electrical unit 2 are read out from the read-only memory 21 and settings taking these data into consideration are performed in the base unit 1, in step 507.

For example, the individual configuration of the pluggable electrical unit 2 may comprise the direction of transmission of one or more lines of the module bus 43' and 43".

In addition, the individual configuration of the pluggable electrical unit 2 may consist in that the number of data lines of the backplane wiring bus 4 of the base unit 1 is different from the number of data lines of the module bus 43" within the pluggable electrical unit 2. For example, 32 data lines may be provided in the backplane wiring bus 4 of the base unit 1 for operating a 32-bit-wide data bus, accessed fully by pluggable electrical units 2 which have a 32-bit-wide data bus.

Other pluggable electrical units 2 have only a data bus of a smaller width, for example 8 bits, and accordingly have only eight data lines. The differing data bus width of the pluggable electrical unit 2 is noted in the individual configuration data, which are stored in the read-only memory 21 and can be read out by the signal processing means 12 of the base unit 1, so that the data transmission between the base unit 1 and this pluggable electrical unit 2 takes place on only eight data lines of the backplane wiring bus 4.

Subsequently, in step 508, the second bus switch arrangement 34 is activated via the control line 42". In this case, the isolated lines of the module bus 43" are connected to the associated non-isolated lines of the module bus 43'.

In step 509, the pluggable electrical unit 2, fully connected electrically to the base unit 1, is functionally tested.

If a fault is detected, branch "1" of decision step 509, the second bus switch arrangement 34 is deactivated and the connection between the isolated lines of the module bus 43" and the associated non-isolated lines of the module bus 43' is disconnected, in step 550. In the following step 551, the positive potential to the control terminal 314 of the variable resistor 31 is switched off. The variable resistor 31 then goes over into its high-resistance state in a ramp-shaped manner and the switching means of the pluggable electrical unit 2 are disconnected from the power supply. In step 552, the first bus switch arrangement 33 is deactivated and the connection between the isolated signal lines of the identification bus 41" and the isolated control line 42" and the associated non-isolated signal lines of the identification bus 41' and the non-isolated control line 42' is disconnected. In step 599, all the signal lines of the pluggable electrical unit 2 are isolated from the signal lines of the base unit 1 and the sequence is ended. The incompatible pluggable electrical unit 2 is passive in the modular system. Disruptions to units already in operation and damage to the unit to be inserted are consequently avoided.

Once the functional test has been completed without any faults, branch "0" of decision step 509, the pluggable electrical unit 2 is logically integrated into the modular system, in step 510. The pluggable electrical unit 2 is ready for operation and can be operated as intended. In step 599, the initialization of the pluggable electrical unit 2 is ended.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of initializing a pluggable electrical unit in a modular system, said system comprising a base unit, at least one pluggable electrical unit, each pluggable electrical unit having module electronics and a read-only memory with identifiers that clearly identify said unit and an interface between the base unit and the pluggable electrical unit, said interface equipped with a variable resistor arranged in a feed line, said method comprising:

bringing the variable resistor into its low-resistance state in a controlled manner after the elapse of a first waiting time, which begins with the insertion of the pluggable electrical unit in said system, connecting the read-only memory to the base unit after the elapse of a second waiting time, beginning with the end of the first waiting time, testing on the basis of the identifying identifiers, the compatibility of the pluggable electrical unit with the base unit, and disconnecting the read-only memory from the base unit and bringing the variable resistor in a controlled manner into its high-resistance state when said pluggable unit is not compatible with said base unit.

2. The method of claim 1 wherein said system further comprises a first switching means and said read-only memory is connected to said base unit by switching said first switching means to conduct and said read-only memory is disconnected from said base unit by switching said first switching means to cease conducting.

3. The method of claim 1 further comprising connecting the module electronics to the base unit when said pluggable unit is compatible with said base unit.

4. The method of claim 1 wherein said system further comprises a first switching means and a second switching means and said read-only memory is connected to said base unit by switching said first switching means to conduct and said read-only memory is disconnected from said base unit by switching said first switching means to cease conducting and said method further comprises switching said second switching means to conduct and connect the module electronics to the base unit when said pluggable unit is compatible with said base unit.

5. The method of claim 4 further comprising testing said pluggable unit functionally and switching said second switching means to not conduct and disconnect the module electronics from the base unit when said pluggable unit is faulty.

6. The method of claim 4 further comprising testing said pluggable unit functionally and when said pluggable unit is faulty switching both said first switching means and said second switching means to not conduct to thereby disconnect said read-only memory and said module electronics, respectively, from said base unit.

7. The method of claim 1 further comprising configuring the interface of the base unit in accordance with the identifying identifiers.

8. A method of initializing a pluggable electrical unit in a modular system, said system comprising a base unit, at least one pluggable electrical unit, each pluggable electrical unit having module electronics and a read-only memory with identifiers that clearly identify said unit and an interface between the base unit and the pluggable electrical unit, said interface equipped with a variable resistor arranged in a feed line, first switching means, through which the read-only memory is disconnected from the base unit, and second switching means, through which the module electronics are disconnected from the base unit, said method comprising:

bringing the variable resistor into its low-resistance state in a controlled manner after the elapse of a first waiting time, which begins with the insertion of the pluggable electrical unit in said system, switching the first switching means to conduct and connect the read-only memory to the base unit after the elapse of a second waiting time, beginning with the end of the first waiting time, testing on the basis of the identifying identifiers, the compatibility of the pluggable electrical unit with the base unit, switching the second switching means to conduct and connect the module electronics to the base unit when said pluggable unit is compatible with said base unit, and when said pluggable unit is not compatible with said base unit, isolating the read-only memory from the base unit by switching said first switching means to not conduct and bringing the variable resistor in a controlled manner into its high-resistance state.

9. The method of claim 8, characterized in that the pluggable electrical unit, fully connected electrically to the base unit, is functionally tested and, if a fault is detected, the module electronics and the read-only memory are isolated from the base unit by operating said first and second switching means to each not conduct and the variable resistor is brought in a controlled manner into its high-resistance state.

10. The method of claim 8 further comprising configuring the interface of the base unit in accordance with the identifying identifiers.

11. A method of initializing a pluggable electrical unit in a modular system, said system comprising a base unit, at least one pluggable electrical unit, each pluggable electrical unit having module electronics and a read-only memory with identifiers that clearly identify said unit and an interface between the base unit and the pluggable electrical unit, said interface equipped with a variable resistor arranged in a feed line, first switching means, through which the read-only memory is disconnected from the base unit, and second switching means, through which the module electronics are disconnected from the base unit, said method comprising:

bringing the variable resistor into its low-resistance state in a controlled manner after the elapse of a first waiting time, which begins with the insertion of the pluggable electrical unit in said system, switching the first switching means to conduct and connect the read-only memory to the base unit after the elapse of a second waiting time, beginning with the end of the first waiting time, testing on the basis of the identifying identifiers, the compatibility of the pluggable electrical unit with the base unit, switching the second switching means to conduct and connect the module electronics to the base unit when said pluggable unit is compatible with said base unit, and switching the second switching means to not conduct and disconnect the module electronics from the base unit when said pluggable unit is faulty.

12. The method of claim 8 further comprising when said pluggable unit is not compatible with said base unit isolating the read-only memory from the base unit by switching said first switching means not to conduct and bringing the variable resistor in a controlled manner into its high-resistance state.

13. The method of claim 11 characterized in that the pluggable electrical unit, fully connected electrically to the base unit is functionally tested and, if a fault is detected, the module electronics and the read-only memory are by operating said first and second switching means isolated from the base unit and the variable resistor is brought in a controlled manner into its high-resistance state.

14. The method of claim 11 further comprising configuring the interface of the base unit in accordance with the identifying identifiers.

* * * * *